United States Patent
Suzuki

(10) Patent No.: US 10,019,619 B2
(45) Date of Patent: Jul. 10, 2018

(54) BIOMETRICS AUTHENTICATION DEVICE AND BIOMETRICS AUTHENTICATION METHOD

(71) Applicant: FUJITSU FRONTECH LIMITED, Tokyo (JP)

(72) Inventor: Tomoharu Suzuki, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 15/261,137

(22) Filed: Sep. 9, 2016

(65) Prior Publication Data
US 2017/0206402 A1    Jul. 20, 2017

Related U.S. Application Data

(63) Continuation of application No. PCT/JP2014/058386, filed on Mar. 25, 2014.

(51) Int. Cl.
*G06K 9/00* (2006.01)
*G06F 21/32* (2013.01)

(52) U.S. Cl.
CPC ..... *G06K 9/00087* (2013.01); *G06K 9/00067* (2013.01); *G06F 21/32* (2013.01)

(58) Field of Classification Search
USPC ........ 1/1; 340/5.53, 5.83; 348/118; 382/115, 382/118, 124, 125, 168, 199, 204, 261;
(Continued)

(56) References Cited

U.S. PATENT DOCUMENTS

| | | | |
|---|---|---|---|
| 6,282,304 B1 * | 8/2001 | Novikov | G06F 3/03543 340/5.83 |
| 6,876,757 B2 * | 4/2005 | Yau | G06K 9/00067 340/5.83 |

(Continued)

FOREIGN PATENT DOCUMENTS

| | | |
|---|---|---|
| EP | 2 092 460 | 8/2009 |
| JP | 2000-358025 | 12/2000 |

(Continued)

OTHER PUBLICATIONS

Shin, KY, et al., "Finger-Vein Image Enhancement Using a Fuzzy-Based Fusion Method with Gabor and Retinex Filtering," Sensors, 14, pp. 3095-3129, Feb. 2014.*

(Continued)

*Primary Examiner* — Xuemei Chen
(74) *Attorney, Agent, or Firm* — Greer Burns & Crain Ltd.

(57) ABSTRACT

A biometrics authentication device is configured to include: a filter that extracts from an input image directional features that respectively correspond to directions different from each other; an perpendicular filter that, from among the directional features extracted from the filter, decreases a luminance value of the entirety of a directional feature that corresponds to a prescribed direction, increases a luminance value of the entirety of a directional feature that corresponds to a direction perpendicular to the directional feature that corresponds to the prescribed direction, and outputs other directional features with no change; a non-directional feature generation processing unit that generates a non-directional feature on the basis of the directional features output from the perpendicular filter; a matching processing unit that obtains a similarity between the non-directional feature and a registered non-directional feature stored in a storing unit;

(Continued)

and a determining unit that determines identity by using the similarity.

9 Claims, 9 Drawing Sheets

(58) Field of Classification Search
USPC .................................................. 600/437, 443
See application file for complete search history.

(56) References Cited

U.S. PATENT DOCUMENTS

| | | | |
|---|---|---|---|
| 7,072,525 B1* | 7/2006 | Covell | G06T 5/50 |
| | | | 382/261 |
| 7,359,555 B2* | 4/2008 | Porikli | G03B 15/006 |
| | | | 382/204 |
| 7,496,214 B2* | 2/2009 | Zhang | G06K 9/00067 |
| | | | 340/5.53 |
| 7,636,455 B2* | 12/2009 | Keaton | G06K 9/0063 |
| | | | 348/118 |
| 7,903,880 B2* | 3/2011 | Wyatt | G06K 9/4609 |
| | | | 382/199 |
| 8,285,010 B2* | 10/2012 | Rowe | A61B 5/0059 |
| | | | 382/115 |
| 8,358,870 B2* | 1/2013 | Abiko | G06K 9/00026 |
| | | | 382/107 |
| 8,712,114 B2* | 4/2014 | Thaniyath | G06T 5/002 |
| | | | 382/124 |
| 9,280,805 B2* | 3/2016 | Esaki | G06T 5/001 |
| 9,317,761 B2* | 4/2016 | Kong | G06K 9/00885 |
| 2004/0042645 A1* | 3/2004 | Wang | G06K 9/00067 |
| | | | 382/125 |
| 2005/0084155 A1 | 4/2005 | Yumoto et al. | |
| 2006/0020203 A1* | 1/2006 | Tamura | G06T 5/20 |
| | | | 600/437 |
| 2006/0147096 A1* | 7/2006 | Lee | G06K 9/00067 |
| | | | 382/124 |
| 2007/0036400 A1* | 2/2007 | Watanabe | G06K 9/001 |
| | | | 382/124 |
| 2008/0298642 A1 | 12/2008 | Meenen | |
| 2009/0245593 A1 | 10/2009 | Suzuki et al. | |
| 2012/0108973 A1* | 5/2012 | Osumi | A61B 8/06 |
| | | | 600/443 |
| 2013/0004028 A1* | 1/2013 | Jones | G06K 9/00228 |
| | | | 382/118 |
| 2013/0136327 A1 | 5/2013 | Kamei | |
| 2013/0251213 A1 | 9/2013 | Nada et al. | |
| 2014/0016832 A1 | 1/2014 | Kong et al. | |
| 2014/0133711 A1* | 5/2014 | Abe | G06K 9/036 |
| | | | 382/115 |
| 2015/0020181 A1 | 1/2015 | Iwata | |
| 2015/0071538 A1* | 3/2015 | Marchisio | G06K 9/4647 |
| | | | 382/168 |

FOREIGN PATENT DOCUMENTS

| | | |
|---|---|---|
| JP | 2005-149455 | 6/2005 |
| JP | 2006-301881 | 11/2006 |
| JP | 2009-245347 | 10/2009 |
| JP | 2009-301104 | 12/2009 |
| JP | 2012-73684 | 4/2012 |
| JP | 2013-200673 | 10/2013 |
| KR | 2009-0019174 A | 2/2009 |
| KR | 101217214 B1 | 12/2012 |
| WO | 2004/029862 A1 | 4/2004 |
| WO | 2008/054396 A1 | 5/2008 |
| WO | 2012/020718 A1 | 2/2012 |
| WO | 2013/136553 A1 | 9/2013 |

OTHER PUBLICATIONS

Int'l. Search Report issued in Int'l. App. No. PCT/JP2014/058386, dated May 13, 2014.
Arun Ross et al.; "A hybrid fingerprint matcher"; Pattern Recognition vol. 36, No. 7; pp. 1661-1673; Jul. 31, 2003.
EESR issued in corresponding EP patent application No. 14887087.6, dated Sep. 12, 2017.
David D. Zhang; "Palmprint Authentication"; Jan. 1, 2004.
Jen Chun Lee; "A novel biometric system based on palm vein image"; Pattern Recognition Letters; pp. 1520-1528; Sep. 12, 2012.
Kuang-Shyr Wu et al.; "A secure palm vein recognition system"; The Journal of Systems and Software; pp. 2870-2876; Nov. 1, 2013.
Zhenan Sun et al.; "Ordinal Palmprint Representation for Personal Identification"; IEEE Computer Society Conference on Computer Vision and Pattern Recognition; pp. 2-6; Jun. 20, 2005.
Claire Petitimbert et al.; "Biometric Identification using Hand Vein Patterns"; Electronics & IT-P6 Student Project Spring semester 2011—Group 620—Dept. of Electronic Systems; Aalborg Univ.; May 30, 2011.
Zohaib Khan et al.; "Contour Code_Robust and Efficient Multispectral Palmprint Encoding for Human Recognition"; IEEE Int'l. Conf. on Computer Vision; pp. 1935-1942; Nov. 6, 2011.

* cited by examiner

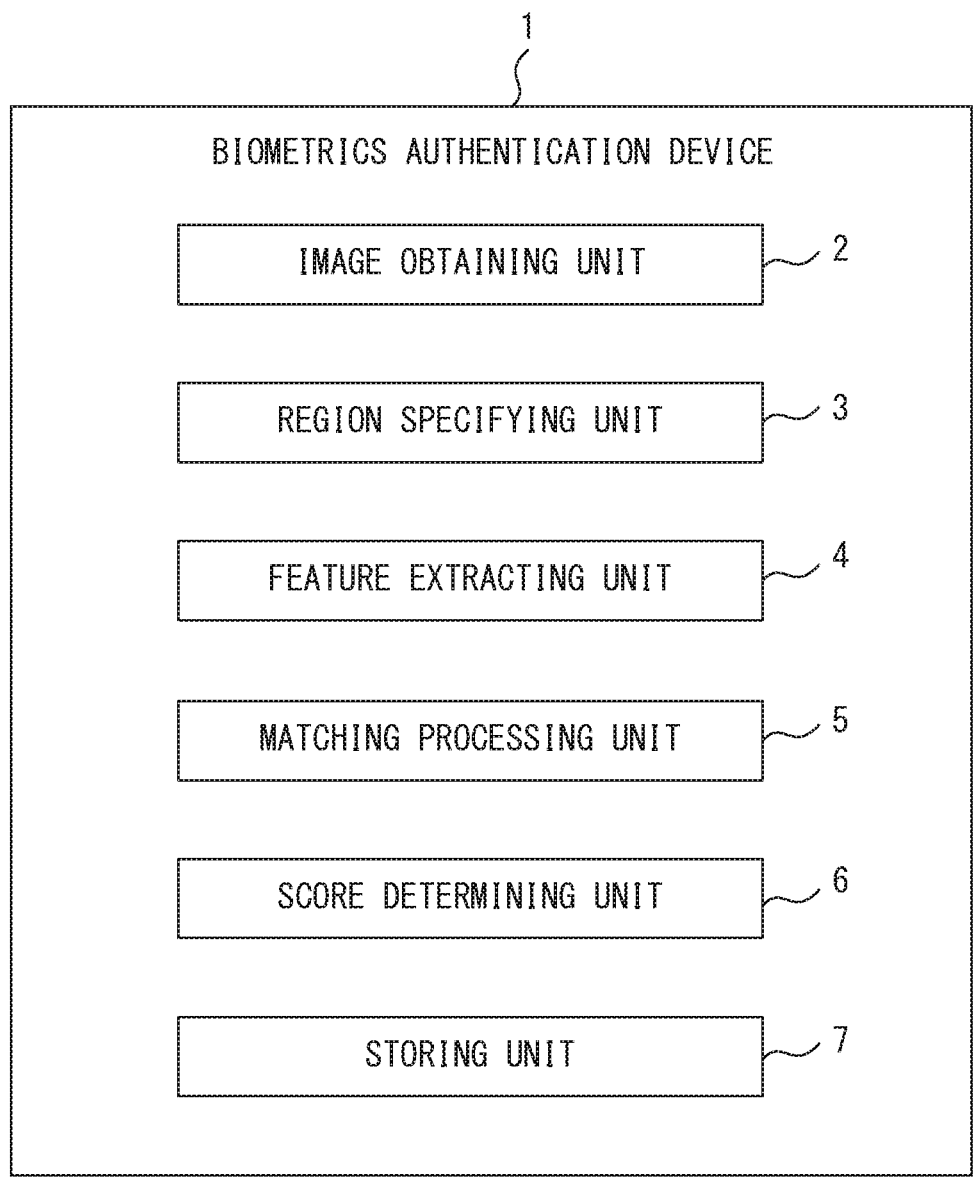
F I G. 1

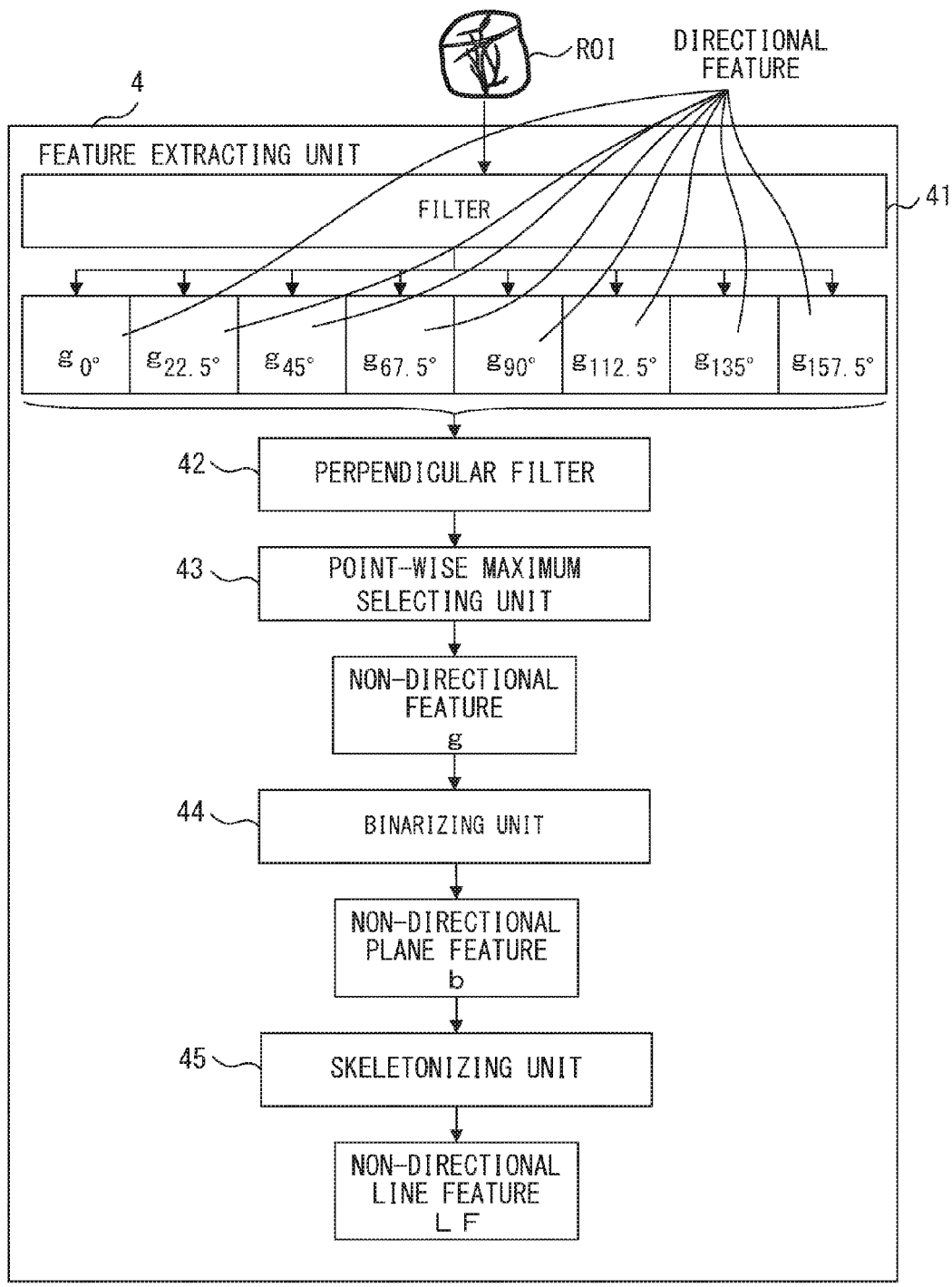
F I G. 3

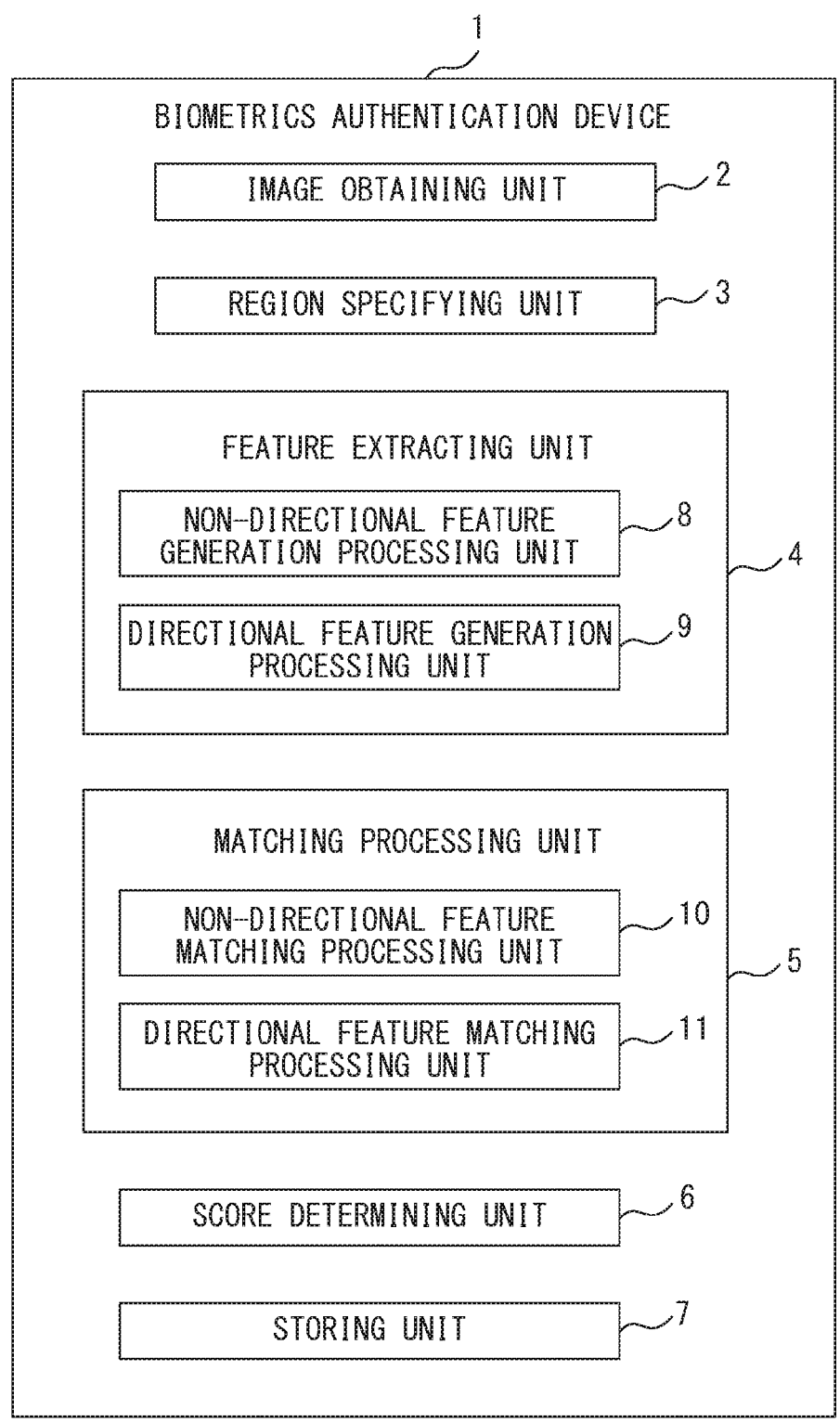
F I G. 5

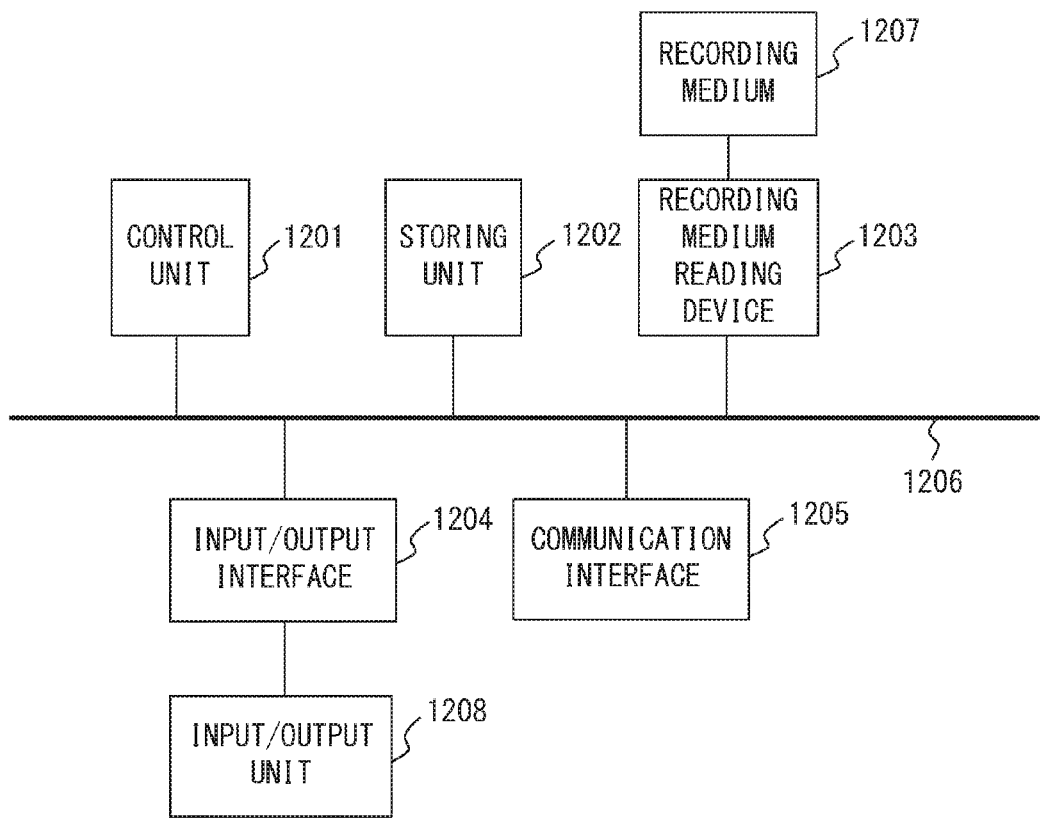
F I G. 9

BIOMETRICS AUTHENTICATION DEVICE AND BIOMETRICS AUTHENTICATION METHOD

CROSS-REFERENCE TO RELATED APPLICATION

This application is continuation application of International Application PCT/JP2014/058386 filed on Mar. 25, 2014 and designated the U.S., the entire contents of which are incorporated herein by reference.

FIELD

Embodiments of the present disclosure relate to a technology for biometrics authentication.

BACKGROUND

In an existing biometrics authentication device, when biological information extracted from a photographed image and registered biological information match each other, identity is determined. The biological information includes features that denote palm prints, veins, and the like, and when biometrics authentication is performed by using the feature denoting a vein, the feature denoting a palm print needs to be separated from the photographed image such that as much as possible only the feature denoting a vein is included in the biological information. As an example of a method for separating the feature denoting a palm print, a method for optically separating the feature denoting a palm print by using a polarizing filter is known. As another example of the method, a method using plural-wavelength photographing is known.

Related Art Document: A. Ross, A. K. Jain, and J. Reisman, "A Hybrid fingerprint matcher", Pattern Recognition, vol. 36, no. 7, pp. 1661-1673, 2003.

SUMMARY

A biometrics authentication device according to the embodiments of the present disclosure includes: a filter that extracts from an input image directional features that respectively correspond to directions different from each other; an perpendicular filter that, from among the directional features extracted from the filter, decreases a luminance value of the entirety of a directional feature that corresponds to a prescribed direction, increases a luminance value of the entirety of a directional feature that corresponds to a direction perpendicular to the directional feature that corresponds to the prescribed direction, and outputs other directional features with no change; a non-directional feature generation processing unit that generates a non-directional feature on the basis of the directional features output from the perpendicular filter; a matching processing unit that obtains a similarity between the non-directional feature and a registered non-directional feature stored in a storing unit; and a determining unit that determines identity by using the similarity.

Further, a biometrics authentication device according to the embodiments of the present disclosure includes: a filter that extracts from an input image directional features that respectively correspond to directions different from each other; a non-directional feature generation processing unit that generates a non-directional feature on the basis of the directional features extracted from the filter; a selecting unit that selects a directional feature that corresponds to a prescribed direction from among the directional features extracted from the filter, and outputs the directional feature as a significant directional feature, and that also selects a directional feature that corresponds to a direction perpendicular to the significant directional feature from among the directional features extracted from the filter, and outputs the directional feature as an perpendicular directional feature; a non-directional feature matching processing unit that obtains a first similarity between the non-directional feature and a registered non-directional feature stored in a storing unit; a directional feature matching processing unit that obtains a second similarity between the significant directional feature and a registered significant directional feature stored in the storing unit, and that also obtains a third similarity between the perpendicular directional feature and a registered perpendicular directional feature stored in the storing unit; a similarity adjusting unit that applies a smaller weight on the second similarity than on the third similarity, and outputs a sum of the second similarity and the third similarity after weighting as a fourth similarity; and a determining unit that determines identity by using the first similarity and the fourth similarity.

Furthermore, a biometrics authentication device according to the embodiments of the present disclosure includes: a filter that extracts from an input image directional features that respectively correspond to directions different from each other; a non-directional feature generation processing unit that generates a non-directional feature on the basis of the directional features extracted from the filter; a selecting unit that selects a directional feature that corresponds to a prescribed direction from among the directional features extracted from the filter, and outputs the directional feature as a significant directional feature, and that also selects a directional feature that corresponds to a direction perpendicular to the significant directional feature from among the directional features extracted from the filter, and outputs the directional feature as an perpendicular directional feature; a non-directional feature matching processing unit that obtains a first similarity between the non-directional feature and a registered non-directional feature stored in a storing unit; a directional feature matching processing unit that obtains a second similarity between the significant directional feature and a registered significant directional feature stored in the storing unit, and that also obtains a third similarity between the perpendicular directional feature and a registered perpendicular directional feature stored in the storing unit; a similarity adjusting unit that applies a greater weight on the third similarity than on the second similarity, and outputs a sum of the second similarity and the third similarity after weighting as a fourth similarity; and a determining unit that determines identity by using the first similarity and the fourth similarity.

A biometrics authentication method according to the embodiments of the present disclosure includes: extracting from an input image, by a computer, directional features that respectively correspond to directions different from each other; from among the directional features that have been extracted, decreasing, by the computer, a luminance value of the entirety of a directional feature that corresponds to a prescribed direction, increasing a luminance value of the entirety of a directional feature that corresponds to a direction perpendicular to the directional feature that corresponds to the prescribed direction, and outputting other directional features with no change; generating, by the computer, a non-directional feature on the basis of the directional features that have been output; obtaining, by the computer, a similarity between the non-directional feature and a registered non-directional feature stored in a storing unit; and determining, by the computer, identity by using the similarity.

Further, a biometrics authentication method according to the embodiments of the present disclosure includes: extracting from an input image, by a computer, directional features that respectively correspond to directions different from each other; generating, by the computer, a non-directional feature on the basis of the directional features that have been extracted; selecting, by the computer, a directional feature that corresponds to a prescribed direction from among the directional features that have been extracted, and outputting the directional feature as a significant directional feature; selecting, by the computer, a directional feature that corresponds to a direction perpendicular to the significant directional feature from among the directional features that have been extracted, and outputting the directional feature as an perpendicular directional feature; obtaining, by the computer, a first similarity between the non-directional feature and a registered non-directional feature stored in a storing unit; obtaining, by the computer, a second similarity between the significant directional feature and a registered significant directional feature stored in the storing unit; obtaining, by the computer, a third similarity between the perpendicular directional feature and a registered perpendicular directional feature stored in the storing unit; applying, by the computer, a smaller weight on the second similarity than on the third similarity, and outputting a sum of the second similarity and the third similarity after weighting as a fourth similarity; and determining, by the computer, identity by using the first similarity and the fourth similarity.

Furthermore, a biometrics authentication method according to the embodiments of the present disclosure includes: extracting from an input image, by a computer, directional features that respectively correspond to directions different from each other; generating, by the computer, a non-directional feature on the basis of the directional features that have been extracted; selecting, by the computer, a directional feature that corresponds to a prescribed direction from among the directional features that have been extracted, and outputting the directional feature as a significant directional feature; selecting, by the computer, a directional feature that corresponds to a direction perpendicular to the significant directional feature from among the directional features that have been extracted, and outputting the directional feature as an perpendicular directional feature; obtaining, by the computer, a first similarity between the non-directional feature and a registered non-directional feature stored in a storing unit; obtaining, by the computer, a second similarity between the significant directional feature and a registered significant directional feature stored in the storing unit; obtaining, by the computer, a third similarity between the perpendicular directional feature and a registered perpendicular directional feature stored in the storing unit; applying, by the computer, a greater weight on the third similarity than on the second similarity, and outputting a sum of the second similarity and the third similarity after weighting as a fourth similarity; and determining, by the computer, identity by using the first similarity and the fourth similarity.

A non-transitory computer-readable recording medium according to the embodiments of the present disclosure which records a program causes a computer to execute a process including: extracting from an input image directional features that respectively correspond to directions different from each other; from among the directional features that have been extracted, decreasing a luminance value of the entirety of a directional feature that corresponds to a prescribed direction, increasing a luminance value of the entirety of a directional feature that corresponds to a direction perpendicular to the directional feature that corresponds to the prescribed direction, and outputting other directional features with no change; generating a non-directional feature on the basis of the directional features that have been output; obtaining a similarity between the non-directional feature and a registered non-directional feature stored in a storing unit; and determining identity by using the similarity.

Further, a non-transitory computer-readable recording medium according to the embodiments of the present disclosure which records a program causes a computer to execute a process including: extracting from an input image directional features that respectively correspond to directions different from each other; generating a non-directional feature on the basis of the directional features that have been extracted; selecting a directional feature that corresponds to a prescribed direction from among the directional features that have been extracted, and outputting the directional feature as a significant directional feature; selecting a directional feature that corresponds to a direction perpendicular to the significant directional feature from among the directional features that have been extracted, and outputting the directional feature as an perpendicular directional feature; obtaining a first similarity between the non-directional feature and a registered non-directional feature stored in a storing unit; obtaining a second similarity between the significant directional feature and a registered significant directional feature stored in the storing unit; obtaining a third similarity between the perpendicular directional feature and a registered perpendicular directional feature stored in the storing unit; applying a smaller weight on the second similarity than on the third similarity, and outputting a sum of the second similarity and the third similarity after weighting as a fourth similarity; and determining identity by using the first similarity and the fourth similarity.

Furthermore, a non-transitory computer-readable recording medium according to the embodiments of the present disclosure which records a program causes a computer to execute a process including: extracting from an input image directional features that respectively correspond to directions different from each other; generating a non-directional feature on the basis of the directional features that have been extracted; selecting a directional feature that corresponds to a prescribed direction from among the directional features that have been extracted, and outputting the directional feature as a significant directional feature; selecting a directional feature that corresponds to a direction perpendicular to the significant directional feature from among the directional features that have been extracted, and outputting the directional feature as an perpendicular directional feature; obtaining a first similarity between the non-directional feature and a registered non-directional feature stored in a storing unit; obtaining a second similarity between the significant directional feature and a registered significant directional feature stored in the storing unit; obtaining a third similarity between the perpendicular directional feature and a registered perpendicular directional feature stored in the storing unit; applying a greater weight on the third similarity than on the second similarity, and outputting a sum of the second similarity and the third similarity after weighting as a fourth similarity; and determining identity by using the first similarity and the fourth similarity.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates an example of a biometrics authentication device according to a first embodiment.

FIG. 3 illustrates an example of a feature extracting unit according to the first embodiment.

FIG. 5 illustrates an example of a biometrics authentication device according to a second embodiment.

FIG. 9 illustrates an example of hardware of a biometrics authentication device.

DESCRIPTION OF EMBODIMENTS

First Embodiment

Figure 2:
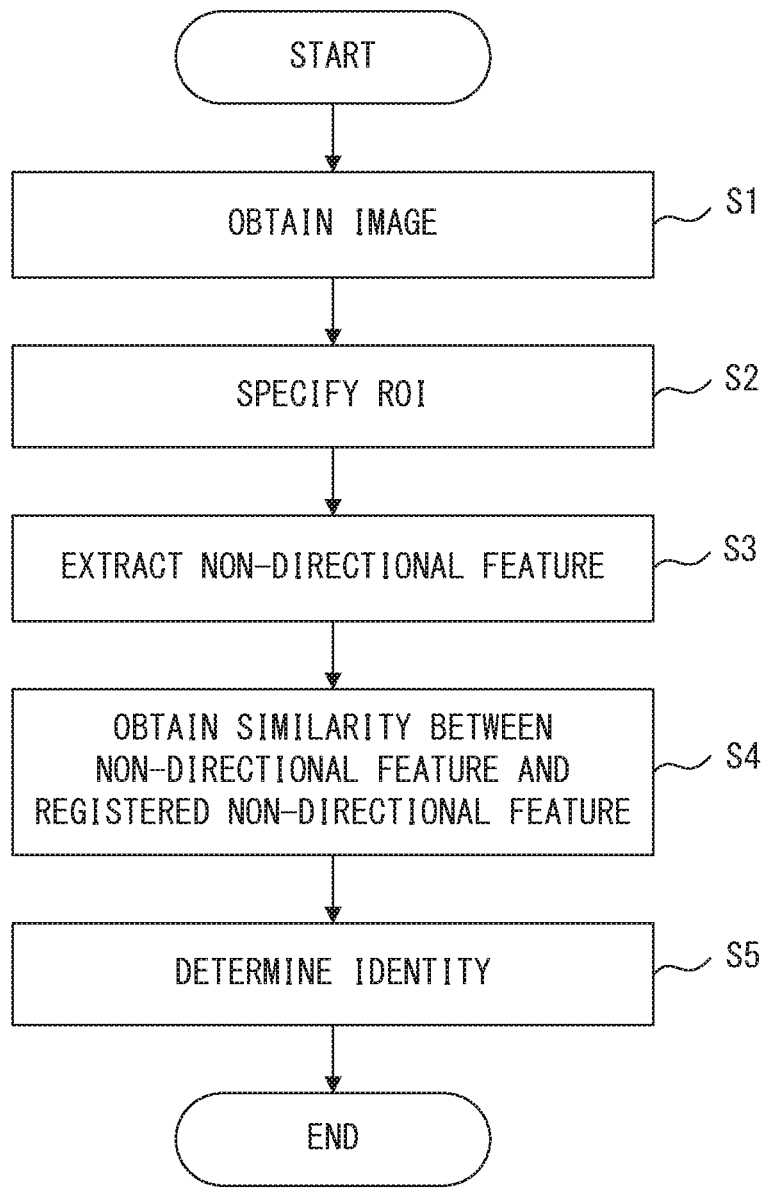
FIG. 2 is a flowchart illustrating a biometrics authentication method according to the first embodiment.

FIG. 1 illustrates an example of a biometrics authentication device according to a first embodiment.

A biometrics authentication device 1 illustrated in FIG. 1 includes an image obtaining unit 2, a region specifying unit 3, a feature extracting unit 4, a matching processing unit 5, a score determining unit 6 (a determining unit), and a storing unit 7.

FIG. 2 is a flowchart illustrating a biometrics authentication method according to the first embodiment.

First, the image obtaining unit 2 obtains an image of a hand of a subject (S1). As an example, the image obtaining unit 2 is an imaging device, and the image obtaining unit 2 obtains a captured image of a hand of a subject by using a single-plate image sensor and respective RGB color filters of a Bayer array.

Then, the region specifying unit 3 specifies a ROI (Region Of Interest) that corresponds to a palm of a subject in the image obtained by the image obtaining unit 2 (S2).

The feature extracting unit 4 then extracts a non-directional feature from an image f of the ROI specified by the region specifying unit 3 (S3). In a case in which filtering S is performed on an image f, the term "non-directional" is defined to obtain a result that is almost the same as a result of performing only the filtering S even when image rotation conversion $T_\theta$ or inverse conversion $T_\theta^{-1}$ of $T_\theta$ on various angles $\theta$ is inserted before the filtering S. Stated another way, the term "non-directional" is defined using symbols to be $S(f) = T_\theta^{-1}(S(T_\theta(f)))$ at an arbitrary angle $\theta$.

Then, the matching processing unit 5 obtains a similarity between the non-directional feature extracted by the feature extracting unit 4 and a registered non-directional feature that has been registered in advance and that has been stored in the storing unit 7 (S4).

The score determining unit 6 determines the identity of the subject according to the similarity obtained by the matching processing unit 5 (S5).

FIG. 3 illustrates an example of the feature extracting unit 4 according to the first embodiment.

The feature extracting unit 4 illustrated in FIG. 3 includes a filter 41, an perpendicular filter 42, a point-wise maximum selecting unit 43, a binarizing unit 44, and a skeletonizing unit 45.

The filter 41 performs Gabor filtering on (luminance values of all pixels of) an input image f of the ROI in eight respective directions $\theta$ (0°, 22.5°, 45°, 67.5°, 90°, 112.5°, 135°, and 157.5°) so as to obtain respective filter responses (luminance values) as directional features $g_\theta$ (a directional feature $g_{0°}$, a directional feature $g_{22.5°}$, a directional feature $g_{45°}$, a directional feature $g_{67.5°}$, a directional feature $g_{90°}$, a directional feature $g_{112.5°}$, a directional feature $g_{135°}$, and a directional feature $g_{157.5°}$). The number of directions $\theta$ set in the filtering is not limited to eight, and may be any number that is greater than or equal to two. The filtering is not limited to Gabor filtering, and may be any type of filtering that has a high filter response to a linear dark portion in respective directions $\theta$ in the image f.

From among the respective directional features $g_\theta$ extracted from the filter 41, the perpendicular filter 42 decreases a luminance value of the entirety of the directional feature $g_{0°}$ that corresponds to a direction $\theta$ of 0° (a directional feature $g_\theta$ of an S (Significant) component), increases a luminance value of the entirety of the directional feature $g_{90°}$ that corresponds to a direction perpendicular to the directional feature $g_\theta$ of the S component (a directional feature $g_\theta$ of a P (Perpendicular) component), and outputs the other directional features $g_\theta$ with no change.

The point-wise maximum selecting unit 43 outputs a non-directional feature g on the basis of the respective directional features ge output from the perpendicular filter 49. As an example, the point-wise maximum selecting unit 43 outputs a maximum directional feature $\max_\theta \{g_\theta(i,j)\}$ as a non-directional feature $g(i,j)$ from among the respective directional features $g_\theta(i,j)$ output from the perpendicular filter 49, as expressed by Expression 1. The i represents a position in a horizontal-axis direction of two-dimensional coordinates, and the j represents a position of a vertical-axis direction of the two-dimensional coordinates, when positions of all of the pixels within the ROI are made to correspond to positions on the two-dimensional coordinates.

$$g(i,j) := \max_\theta \{g_\theta(i,j)\}, \ (i,j) \in ROI \qquad \text{Expression 1}$$

The binarizing unit 44 outputs 1 as a non-directional plane feature $b(i,j)$ when the non-directional feature $g(i,j)$ output from the point-wise maximum selecting unit 43 has a positive value, and the binarizing unit 44 outputs 0 as the non-directional plane feature $b(i,j)$ when the non-directional feature $g(i,j)$ has a value that is not a positive value, as expressed by Expression 2. The obtained non-directional plane feature b is stored in the storing unit 7.

$$b(i,j) = \begin{cases} 1, & \text{if } g(i,j) > 0 \\ 0, & \text{other} \end{cases} \qquad \text{Expression 2}$$

In the description above, the binarizing unit 44 has performed binarization by performing simple thresholding using a constant of 0, but the binarizing unit 44 may perform binarization using a more advanced Adaptive-thresholding scheme.

The skeletonizing unit 45 performs skeletonizing on the non-directional plane feature b so as to obtain a non-directional line feature LF, as expressed by Expression 3.

The skel represents skeletonizing. The obtained non-directional line feature LF is stored in the storing unit 7. The line feature is a linear image.

$$LF := skel(b) \quad \text{Expression 3}$$

Figure 4:
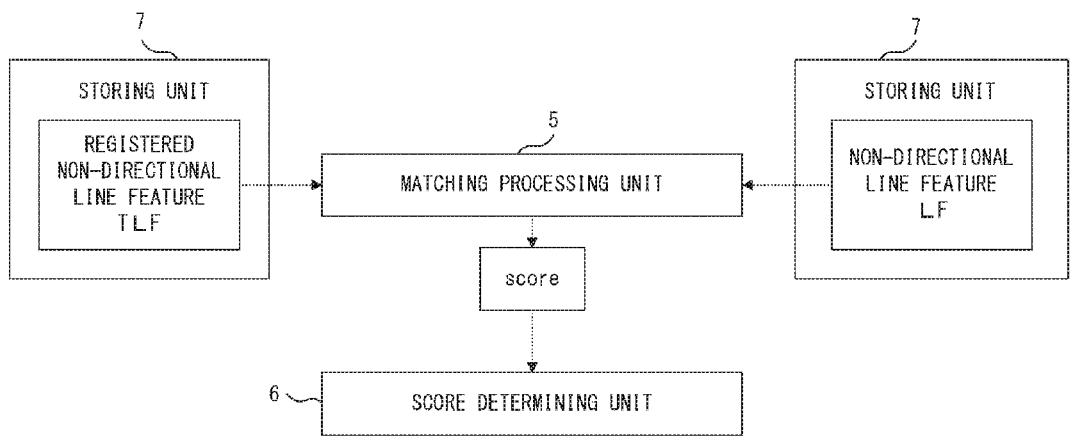
FIG. 4 illustrates an example of a matching processing unit according to the first embodiment.

The matching processing unit 5 illustrated in FIG. 1 obtains a similarity score between the non-directional line feature LF that has been output from the skeletonizing unit 45 and that has been stored in the storing unit 7 and a registered non-directional line feature TLF that has been registered in advance and that has been stored in the storing unit 7, as illustrated in FIG. 4.

The score determining unit 6 illustrated in FIG. 1 determines the identity of the subject when the similarity score is greater than or equal to a threshold.

As an example, when a direction perpendicular to a longitudinal direction of a hand of a subject is 0°, a palm print is primarily configured of lines generated when the hand is clenched, and therefore a direction θ that corresponds to a directional feature $g_\theta$ that is estimated to include a large portion indicating the palm print is 0°. Accordingly, the directional feature $g_\theta$ of the S component is a directional feature $g_\theta$ whereby a palm print in the ROI has been emphasized, and a non-directional line feature LF generated by using the directional feature $g_\theta$ of the S component whereby the luminance value of the entirety decreases is a feature whereby an influence of the palm print has been suppressed. This allows the identity of the subject to be determined in a state in which the influence of the palm print has been suppressed, and consequently authentication accuracy can be improved. Stated another way, the biometrics authentication device 1 according to the first embodiment can prevent the FAR from increasing even when a method for physically separating a feature denoting a palm print from an image fails to be applied. Even when melanin is abnormally deposited, in particular, in a palm of a subject, and a large portion indicating a palm print is included in a directional feature $g_\theta$, the identity of the subject can be determined in a state in which an influence of the palm print on the non-directional line feature LF is suppressed, and consequently the FAR can be reduced.

When a longitudinal direction of a hand of a subject is 90°, a vein principally extends in a direction from a wrist to four fingers, and therefore a direction θ that corresponds to a directional feature $g_\theta$ estimated to include a large portion indicating the vein is 90°. Accordingly, the directional feature $g_\theta$ of the P component is a directional feature $g_\theta$ whereby the vein within the ROI has been emphasized, and a non-directional line feature LF generated by using the directional feature $g_\theta$ of the P component whereby the luminance value of the entirety has increased is a feature whereby the vein has been emphasized. Consequently, the identity of the subject can be determined in a state in which a vein that has a higher level of diversity than the palm print has been emphasized, and therefore the false rejection rate can be reduced.

Second Embodiment

FIG. 5 illustrates an example of a biometrics authentication device according to a second embodiment.

A biometrics authentication device 1 illustrated in FIG. 5 includes an image obtaining unit 2, a region specifying unit 3, a feature extracting unit 4, a matching processing unit 5, a score determining unit 6 (a determining unit), and a storing unit 7.

The feature extracting unit 4 includes a non-directional feature generation processing unit 8 and a directional feature generation processing unit 9.

The matching processing unit 5 includes a non-directional feature matching processing unit 10 and a directional feature matching processing unit 11.

Figure 6:
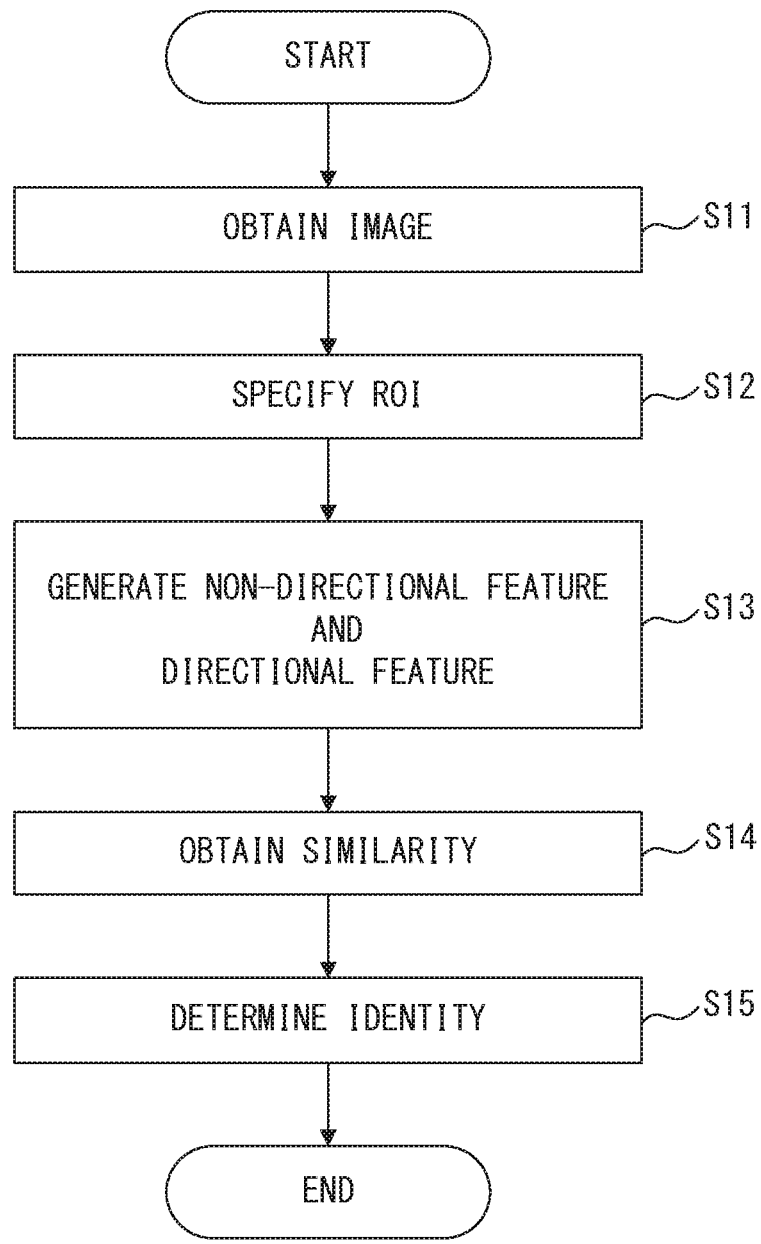
FIG. 6 is a flowchart illustrating a biometrics authentication method according to the second embodiment.

FIG. 6 is a flowchart illustrating a biometrics authentication method according to the second embodiment.

First, the image obtaining unit 2 obtains an image of a hand of a subject (S11). As an example, the image obtaining unit 2 is an imaging device, and the image obtaining unit 2 obtains a captured image of a hand of a subject by using a single-plate image sensor and respective RGB color filters of a Bayer array.

Then, the region specifying unit 3 specifies a ROI that corresponds to a palm of the subject in the image obtained by the image obtaining unit 2 (S12).

The non-directional feature generation processing unit 8 generates a non-directional feature from an image f of the ROI specified by the region specifying unit 3, and the directional feature generation processing unit 9 generates a directional feature from the image f of the ROI specified by the region specifying unit 3 (S13). The term. "directional" is defined to not be non-directional.

The non-directional feature matching processing unit 10 obtains a similarity between the non-directional feature generated by the non-directional feature extraction processing unit 8 and a registered non-directional feature that has been registered in advance and that has been stored in the storing unit 7, and the directional feature matching processing unit 11 obtains a similarity between the directional feature generated by the directional feature extraction processing unit 9 and a registered directional feature that has been registered in advance and that has been stored in the storing unit 7 (S14).

Then, the score determining unit 6 determines the identity of the subject according to the similarity obtained by the non-directional feature matching processing unit 10 and the similarity obtained by the directional feature matching processing unit 11 (S15).

Figure 7:
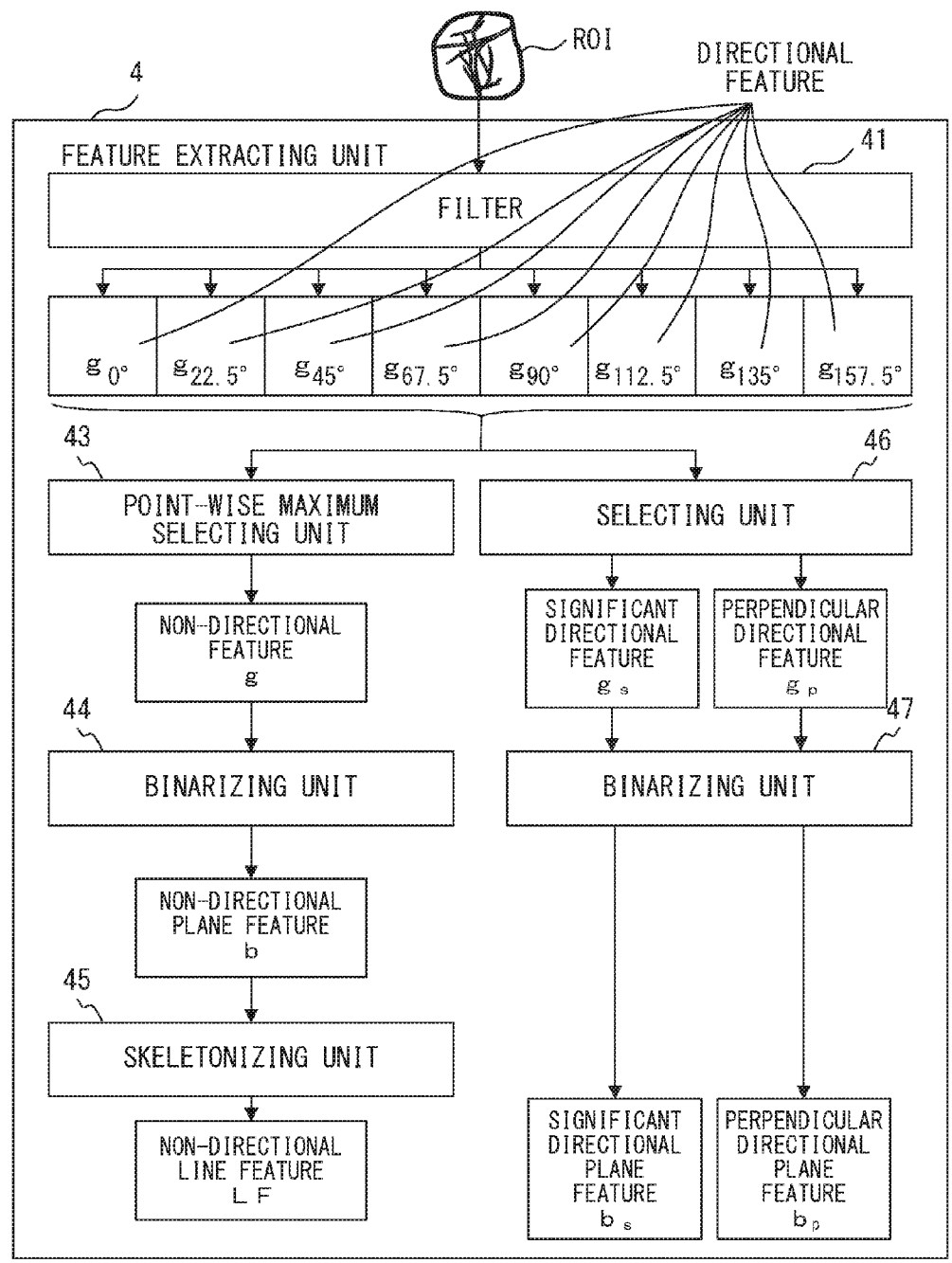
FIG. 7 illustrates an example of a feature extracting unit according to the second embodiment.

FIG. 7 illustrates an example of the feature extracting unit 4 according to the first embodiment. The same components as the components illustrated in FIG. 3 are denoted by the same reference numerals, and the description thereof is omitted.

The feature extracting unit 4 illustrated in FIG. 7 includes a filter 41, a point-wise maximum selecting unit 43, a binarizing unit 44, a skeletonizing unit 45, a selecting unit 46, and a binarizing unit 47.

The point-wise maximum selecting unit 43 outputs a maximum direction feature $\max_\theta\{g_\theta(i,j)\}$ as a non-directional feature g(i,j) from among respective directional features $g_\theta(i,j)$ extracted from the filter 41, as expressed by Expression 1 above.

The binarizing unit 44 outputs 1 as a non-directional plane feature b(i,j) when the non-directional feature g(i,j) output from the point-wise maximum selecting unit 43 has a positive value, and the binarizing unit 44 outputs 0 as the non-directional plane feature b(i,j) when the non-directional feature g(i,j) has a value that is not a positive value, as expressed by Expression 2 above. The obtained non-directional plane feature b is stored in the storing unit 7.

The skeletonizing unit 45 performs skeletonizing on the non-directional plane feature b so as to obtain a non-directional line feature LF, as expressed by Expression 3 above. The skel represents skeletonizing. The obtained non-directional line feature LF is stored in the storing unit 7.

From among the respective directional features $g_\theta$ extracted from the filter 41, the selecting unit 46 selects a directional feature $g_0°$ that corresponds to a direction $\theta$ of 0°, and outputs the directional feature $g_0°$ as a significant directional feature $g_s$, and the selecting unit 46 also selects a directional feature $g_{90}°$ that corresponds to a direction perpendicular to the significant directional feature $g_\theta$, and outputs the directional feature $g_{90}°$ as an perpendicular directional feature $g_p$.

The binarizing unit 47 performs binarization on each of the significant directional feature $g_s$ and the perpendicular directional feature $g_p$ selected by the selecting unit 46, and outputs the results as a significant directional plane feature $b_s$ and an perpendicular directional plane feature $b_p$.

As an example, the binarizing unit 47 outputs 1 as the significant directional plane feature $b_s(i,j)$ when the significant directional feature $g_s(i,j)$ is positive, and the binarizing unit 47 outputs 0 as the significant directional plane feature $b_s(i,j)$ when the significant directional feature $g_s(i,j)$ is not positive, as expressed by Expression 4. The obtained significant directional plane feature $b_s$ is stored in the storing unit 7.

$$b_s(i,j) = \begin{cases} 1, & \text{if } g_s(i,j) > 0 \\ 0, & \text{other} \end{cases} \quad \text{Expression 4}$$

In addition, the binarizing unit 47 outputs 1 as the perpendicular directional plane feature $b_p(i,j)$ when the perpendicular directional feature $g_p(i,j)$ is positive, and the binarizing unit 47 outputs 0 as the perpendicular directional plane feature $b_p(i,j)$ when the perpendicular directional feature $g_p(i,j)$ is not positive, as expressed by Expression 5.

The obtained perpendicular directional plane feature $b_p$ is stored in the storing unit 7.

$$b_p(i,j) = \begin{cases} 1, & \text{if } g_p(i,j) > 0 \\ 0, & \text{other} \end{cases} \quad \text{Expression 5}$$

In the description above, the binarizing unit 47 has performed binarization by performing simple thresholding using a constant of 0, but the binarizing unit 47 may perform binarization using a more advanced Adaptive-thresholding scheme.

Figure 8:
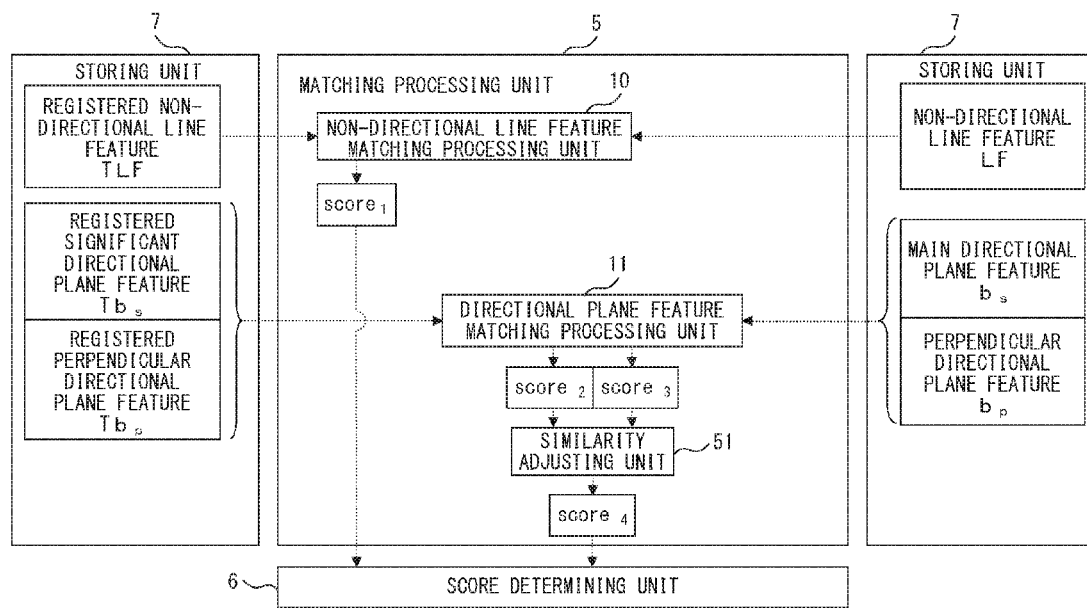
FIG. 8 illustrates an example of a matching processing unit according to the second embodiment.

FIG. 8 illustrates an example of the matching processing unit 5 according to the second embodiment.

The matching processing unit 5 illustrated in FIG. 8 includes a non-directional feature matching processing unit 10, a directional feature matching processing unit 11, and a similarity adjusting unit 51.

The non-directional feature matching processing unit 10 obtains a similarity $score_1$ between the non-directional line feature LF that has been output from the skeletonizing unit 45 and that has been stored in the storing unit 7 and a registered non-directional line feature TLF that has been registered in advance and that has been stored in the storing unit 7.

The directional feature matching processing unit 11 obtains a similarity $score_2$ between the significant directional plane feature $b_s$ that has been output from the binarizing unit 47 and that has been stored in the storing unit 7 and a registered significant directional plane feature $Tb_s$ that has been registered in advance and that has been stored in the storing unit 7, and the directional feature matching processing unit 11 also obtains a similarity $score_3$ between the perpendicular directional plane feature $b_p$ that has been output from the binarizing unit 47 and that has been stored in the storing unit 7 and a registered perpendicular directional plane feature $Tb_p$ that has been registered in advance and that has been stored in the storing unit 7.

The similarity adjusting unit 51 weights the similarities $score_2$ and $score_3$ output from the directional feature matching processing unit 11 by using a constant $a_k$ and a constant c, and the similarity adjusting unit 51 outputs the sum of the weighted similarities $score_2$ and $score_3$ as a similarity $score_4$, as expressed by Expression 6.

$$score_4 := \sum_{2 \leq k \leq 3} a_k * score_k + c \quad \text{Expression 6}$$

Hereinafter, with respect to a certain k, when $a_k > 0$ is established and as an absolute value of the constant $a_k$ becomes relatively greater than another constant $a_k$, it is said that $score_k$ is positively utilized (an action of positively affirming similarity). Otherwise, it is said that $score_k$ is negatively utilized.

The similarity adjusting unit 51 applies a smaller weight on the similarity $score_2$ than on the similarity $score_3$ so as to negatively utilize the similarity $score_2$.

The similarity adjusting unit 51 applies a greater weight on the similarity $score_3$ than on the similarity $score_2$ so as to positively utilize the similarity $score_3$.

Then, the score determining unit 6 illustrated in FIG. 1 determines that the subject is a person to be authenticated when a similarity score that is the sum of the similarity $score_1$ and the similarity $score_4$ is greater than or equal to a threshold.

As described above, by negatively utilizing the similarity $score_2$, the identity of a subject can be determined in a state in which an influence of a palm print has been suppressed, and authentication accuracy can be improved. Stated another way, the biometrics authentication device 1 according to the second embodiment can prevent the FAR from increasing even when a method for physically separating a feature denoting the palm print from an image fails to be applied. Further, even when melanin is abnormally deposited, in particular, in a palm of a subject, and a large portion indicating the palm print is included in a non-directional line feature LF, the identity of the subject can be determined in a state in which an influence of the palm print on the non-directional line feature LF has been suppressed, and consequently the FAR can be reduced.

Further, by positively utilizing the similarity $score_3$, the identity of a subject can be determined in a state in which a vein that has a higher level of diversity than the palm print has been emphasized, and therefore the false rejection rate can be reduced.

FIG. 9 illustrates an example of hardware configuring the biometrics authentication device 1 according to the embodiments of the present disclosure.

As illustrated in FIG. 9, the hardware configuring the biometrics authentication device 1 includes a control unit 1201, a storing unit 1202, a recording medium reading device 1203, an input/output interface 1204, and a communication interface 1205, and these components are mutually connected via a bus 1206. The hardware configuring the biometrics authentication device 1 may be implemented by using a cloud or the like.

As an example, a Central Processing Unit (CPU), a multicore CPU, or a programmable device (a Field Programmable Gate Array (FPGA), a Programmable Logic Device (PLD) or the like) can be considered to be used as the control unit 1201.

The control unit 1201 corresponds to the region specifying unit 3, the feature extracting unit 4, the matching processing unit 5, and the score determining unit 6 illustrated in FIG. 1 or 5.

The storing unit 1202 corresponds to the storing unit 7 illustrated in FIG. 1 or 5, and as an example, a memory such as a Read Only Memory (ROM) or a Random Access Memory (RAM), or a hard disk can be considered to be used as the storing unit 1202. The storing unit 1202 may be used as a work area at the time of execution. In addition, another storing unit may be provided outside the biometrics authentication device 1.

The recording medium reading device 1203 is controlled by the control unit 1201 so as to read data recorded in a recording medium 1207 or to write data to the recording medium 1207. The recording medium 1207 that is removable is a non-transitory computer-readable recording medium, and examples of the recording medium 1207 include a magnetic recording medium, an optical disk, a magneto-optical recording medium, and a semiconductor memory. Examples of the magnetic recording device include a hard disk drive (HDD). Examples of the optical disk include a Digital Versatile Disc (DVD), a DVD-RAM, a Compact Disc Read Only Memory (CD-ROM), and a CD-R (Recordable)/RW (ReWritable). Examples of the magneto-optical recording medium include a Magneto-Optical disk (MO). Note that the storing unit 1202 is also included in the non-transitory recording medium.

The input/output interface 1204 is connected to an input/output unit 1208, and the input/output interface 1204 transmits information input by a user via the input/output unit 1208 to the control unit 1201 via the bus 1206. The input/output interface 1204 also transmits information transmitted from the control unit 1201 to the input/output unit 1208 via the bus 1206.

The input/output unit 1208 corresponds to the image obtaining unit 2 illustrated in FIG. 1 or 5, and examples of the input/output unit 1208 include an imaging device. Examples of the input/output unit 1208 also include a keyboard, a pointing device (for example, a mouse), a touch panel, a Cathode Ray Tube (CRT) display, and a printer.

The communication interface 1205 is an interface for performing Local Area Network (LAN) connection or Internet connection. The communication interface 1205 may be used as an interface for performing LAN connection, Internet connection, or wireless connection with another computer, as needed.

By using a computer having the hardware above, various processing functions performed by the biometrics authentication device 1 are implemented. In this case, a computer executes a program describing the content of the various processing functions performed by the biometrics authentication device 1 such that the above various processing functions (for example, the region specifying unit 3, the feature extracting unit 4, the matching processing unit 5, and the score determining unit 6) are implemented on the computer. The program describing the content of the various processing functions can be stored in the storing unit 1202 or the recording medium 1207.

In a case in which a program is distributed, the recording medium 1207 recording the program, such as a DVD or a CD-ROM, is sold separately, for example. The program can be recorded in a storage of a server computer, and the program can be transferred from the server computer to another computer via a network.

The computer that executes a program stores, for example, the program recorded in the recording medium 1207 or the program transferred from the server computer in the storing unit 1202. The computer reads the program from the storing unit 1202, and performs processing according to the program. The computer may directly read a program from the recording medium 1207, and may perform processing according to the program. Further, every time a program is transferred from the server computer, the computer may perform processing according to the received program.

In the embodiments of the present disclosure, an image processing device that performs authentication using a vein of a palm has been described as an example, but the embodiments are not limited to this, and any other feature detection region of a living body may be used.

The other feature detection region of a living body is not limited to a vein, and as an example may be a vascular image of a living body, a pattern of a living body, a fingerprint or a palm print of a living body, the sole of the foot, a finger or toe, the back of the hand or the instep of the foot, the wrist, the arm, or the like.

When the vein is used for authentication, the other feature detection region of a living body may be any region in which the vein can be observed.

The existence of an other feature detection region of a living body in which biological information can be specified is advantageous to authentication. As an example, when a palm, a face or the like is used, a region can be specified from an obtained image. In addition, various modifications to the embodiments above can be made without departing from the spirit of the embodiments. Further, multiple variations or modifications to the embodiments above can be made by those skilled in the art, and the embodiments are not limited to the accurate configuration and applications described above.

According to the embodiments of the present disclosure, even when a method for physically separating a feature denoting a palm print from an image fails to be applied, an FAR can be prevented from increasing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A biometrics authentication device comprising:
   a filter that extracts from an input image directional features that respectively correspond to directions different from each other;
   an perpendicular filter that, from among the directional features extracted from the filter, decreases a luminance value of the entirety of a directional feature that corresponds to a prescribed direction, increases a luminance value of the entirety of a directional feature that corresponds to a direction perpendicular to the direc- tional feature that corresponds to the prescribed direction, and outputs other directional features with no change;
a non-directional feature generation processing unit that generates a non-directional feature on the basis of the directional features output from the perpendicular filter;
a matching processing unit that obtains a similarity between the non-directional feature and a registered non-directional feature stored in a storing unit; and
a determining unit that determines identity by using the similarity,
wherein the non-directional feature generation processing unit, the matching processing unit and the determining unit are performed by a computer.

2. A biometrics authentication device comprising:
a filter that extracts from an input image directional features that respectively correspond to directions different from each other;
a non-directional feature generation processing unit that generates a non-directional feature on the basis of the directional features extracted from the filter;
a selecting unit that selects a directional feature that corresponds to a prescribed direction from among the directional features extracted from the filter, and outputs the directional feature as a significant directional feature, and that also selects a directional feature that corresponds to a direction perpendicular to the significant directional feature from among the directional features extracted from the filter, and outputs the directional feature as an perpendicular directional feature;
a non-directional feature matching processing unit that obtains a first similarity between the non-directional feature and a registered non-directional feature stored in a storing unit;
a directional feature matching processing unit that obtains a second similarity between the significant directional feature and a registered significant directional feature stored in the storing unit, and that also obtains a third similarity between the perpendicular directional feature and a registered perpendicular directional feature stored in the storing unit;
a similarity adjusting unit that outputs a sum of the second similarity and the third similarity as a fourth similarity; and
a determining unit that determines identity by using the first similarity and the fourth similarity;
wherein the similarity adjusting unit applies a smaller weight on the second similarity than on the third similarity, and
the non-directional feature generation processing unit, the selecting unit, the non-directional feature matching processing unit, the directional feature matching processing unit and the similarity adjusting unit are performed by a computer.

3. A biometrics authentication device comprising:
a filter that extracts from an input image directional features that respectively correspond to directions different from each other;
a non-directional feature generation processing unit that generates a non-directional feature on the basis of the directional features extracted from the filter;
a selecting unit that selects a directional feature that corresponds to a prescribed direction from among the directional features extracted from the filter, and outputs the directional feature as a significant directional feature, and that also selects a directional feature that corresponds to a direction perpendicular to the significant directional feature from among the directional features extracted from the filter, and outputs the directional feature as an perpendicular directional feature;
a non-directional feature matching processing unit that obtains a first similarity between the non-directional feature and a registered non-directional feature stored in a storing unit;
a directional feature matching processing unit that obtains a second similarity between the significant directional feature and a registered significant directional feature stored in the storing unit, and that also obtains a third similarity between the perpendicular directional feature and a registered perpendicular directional feature stored in the storing unit;
a similarity adjusting unit that outputs a sum of the second similarity and the third similarity as a fourth similarity; and
a determining unit that determines identity by using the first similarity and the fourth similarity;
wherein the similarity adjusting unit applies a greater weight on the third similarity than on the second similarity, and
the non-directional feature generation processing unit, the selecting unit, the non-directional feature matching processing unit, the directional feature matching processing unit, the similarity adjusting unit and the determining unit are performed by a computer.

4. A biometrics authentication method comprising:
extracting from an input image, by a computer, directional features that respectively correspond to directions different from each other;
from among the directional features that have been extracted, decreasing, by the computer, a luminance value of the entirety of a directional feature that corresponds to a prescribed direction, increasing a luminance value of the entirety of a directional feature that corresponds to a direction perpendicular to the directional feature that corresponds to the prescribed direction, and outputting other directional features with no change;
generating, by the computer, a non-directional feature on the basis of the directional features that have been output;
obtaining, by the computer, a similarity between the non-directional feature and a registered non-directional feature stored in a storing unit; and
determining, by the computer, identity by using the similarity.

5. A biometrics authentication method comprising:
extracting from an input image, by a computer, directional features that respectively correspond to directions different from each other;
generating, by the computer, a non-directional feature on the basis of the directional features that have been extracted;
selecting, by the computer, a directional feature that corresponds to a prescribed direction from among the directional features that have been extracted, and outputting the directional feature as a significant directional feature;
selecting, by the computer, a directional feature that corresponds to a direction perpendicular to the significant directional feature from among the directional features that have been extracted, and outputting the directional feature as an perpendicular directional feature;

obtaining, by the computer, a first similarity between the non-directional feature and a registered non-directional feature stored in a storing unit;

obtaining, by the computer, a second similarity between the significant directional feature and a registered significant directional feature stored in the storing unit;

obtaining, by the computer, a third similarity between the perpendicular directional feature and a registered perpendicular directional feature stored in the storing unit;

outputting, by the computer, a sum of the second similarity and the third similarity as a fourth similarity; and determining, by the computer, identity by using the first similarity and the fourth similarity, wherein the computer applies a smaller weight on the second similarity than on the third similarity.

6. A biometrics authentication method comprising:

extracting from an input image, by a computer, directional features that respectively correspond to directions different from each other;

generating, by the computer, a non-directional feature on the basis of the directional features that have been extracted;

selecting, by the computer, a directional feature that corresponds to a prescribed direction from among the directional features that have been extracted, and outputting the directional feature as a significant directional feature;

selecting, by the computer, a directional feature that corresponds to a direction perpendicular to the significant directional feature from among the directional features that have been extracted, and outputting the directional feature as an perpendicular directional feature;

obtaining, by the computer, a first similarity between the non-directional feature and a registered non-directional feature stored in a storing unit;

obtaining, by the computer, a second similarity between the significant directional feature and a registered significant directional feature stored in the storing unit;

obtaining, by the computer, a third similarity between the perpendicular directional feature and a registered perpendicular directional feature stored in the storing unit;

outputting, by the computer, a sum of the second similarity and the third similarity as a fourth similarity; and determining, by the computer, identity by using the first similarity and the fourth similarity;

wherein the computer applies a greater weight on the third similarity than on the second similarity.

7. A non-transitory computer-readable recording medium which records a program for causing a computer to execute a process comprising:

extracting from an input image directional features that respectively correspond to directions different from each other;

from among the directional features that have been extracted, decreasing a luminance value of the entirety of a directional feature that corresponds to a prescribed direction, increasing a luminance value of the entirety of a directional feature that corresponds to a direction perpendicular to the directional feature that corresponds to the prescribed direction, and outputting other directional features with no change;

generating a non-directional feature on the basis of the directional features that have been output;

obtaining a similarity between the non-directional feature and a registered non-directional feature stored in a storing unit; and determining identity by using the similarity.

8. A non-transitory computer-readable recording medium which records a program for causing a computer to execute a process comprising:

extracting from an input image directional features that respectively correspond to directions different from each other;

generating a non-directional feature on the basis of the directional features that have been extracted;

selecting a directional feature that corresponds to a prescribed direction from among the directional features that have been extracted, and outputting the directional feature as a significant directional feature;

selecting a directional feature that corresponds to a direction perpendicular to the significant directional feature from among the directional features that have been extracted, and outputting the directional feature as an perpendicular directional feature;

obtaining a first similarity between the non-directional feature and a registered non-directional feature stored in a storing unit;

obtaining a second similarity between the significant directional feature and a registered significant directional feature stored in the storing unit;

obtaining a third similarity between the perpendicular directional feature and a registered perpendicular directional feature stored in the storing unit;

outputting a sum of the second similarity and the third similarity as a fourth similarity; and determining identity by using the first similarity and the fourth similarity;

wherein a smaller weight is applied on the second similarity than on the third similarity.

9. A non-transitory computer-readable recording medium which records a program for causing a computer to execute a process comprising:

extracting from an input image directional features that respectively correspond to directions different from each other;

generating a non-directional feature on the basis of the directional features that have been extracted;

selecting a directional feature that corresponds to a prescribed direction from among the directional features that have been extracted, and outputting the directional feature as a significant directional feature;

selecting a directional feature that corresponds to a direction perpendicular to the significant directional feature from among the directional features that have been extracted, and outputting the directional feature as an perpendicular directional feature;

obtaining a first similarity between the non-directional feature and a registered non-directional feature stored in a storing unit;

obtaining a second similarity between the significant directional feature and a registered significant directional feature stored in the storing unit;

obtaining a third similarity between the perpendicular directional feature and a registered perpendicular directional feature stored in the storing unit; and outputting a sum of the second similarity and the third similarity as a fourth similarity; and determining identity by using the first similarity and the fourth similarity;

wherein a greater weight is applied on the third similarity than on the second similarity.

* * * * *